March 24, 1959
G. DARSIE
2,879,425
HEADLIGHT
Filed April 28, 1958
2 Sheets-Sheet 1
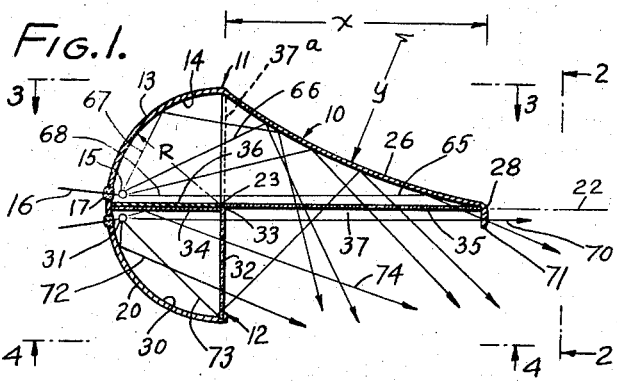

March 24, 1959 G. DARSIE 2,879,425
HEADLIGHT
Filed April 28, 1958 2 Sheets-Sheet 2

INVENTOR.
GEORGE DARSIE
BY
D. Gordon Angus
ATTORNEY

United States Patent Office 2,879,425
Patented Mar. 24, 1959

2,879,425

HEADLIGHT

George Darsie, San Marino, Calif.

Application April 28, 1958, Serial No. 731,423

3 Claims. (Cl. 313—115)

This invention relates to an incandescible lamp.

This application is a continuation-in-part of my co-pending application Serial No. 657,321, filed May 6, 1957, entitled "Headlight," now United States Patent 2,843,779, issued July 15, 1958.

An object of this invention is to provide a lamp of general utility which is particularly suitable for a headlight or a spotlight, and which will thoroughly illuminate a path ahead of an automobile without glare to the eyes of on-coming motorists. A related object is to provide a dual-beam headlight in which both beams provide this advantage for different distances up the road ahead of a car.

In accordance with this invention, a reflector with a concave reflecting surface is provided for reflecting light-rays from an incandescible filament. A shell is connected to the periphery of said reflector, and extends to a forward edge of the headlight which edge is spaced from the reflector and is on the concave side thereof.

The shell includes a curved surface with a straight-line generator, which generator is parallel to the said edge, in the upper section of the lamp. A plurality of incandescible filaments are provided at different vertical elevations and a planar mirror is placed beneath the lower one of said filaments, and generally parallel to said edge. The planar mirror extends from the rear reflector toward the said edge, leaving a transparent window section between the mirror and the said edge for escape of light rays.

According to a preferred but optional feature of the invention, a mirrored filament mounting is provided which has a curvature which is the reverse of the curvature of the reflector, for the purpose of improving the distribution of light from the filament.

The above and other features of this invention will be fully understood from the following detailed description and the accompanying drawings, of which:

Fig. 1 is a cross-section of a lamp according to this invention taken at line 1—1 of Fig. 2;

Fig. 2 is an end view taken at line 2—2 of Fig. 1;

Fig. 3 is a top view taken at line 3—3 of Fig. 1;

Fig. 4 is a bottom view taken at line 4—4 of Fig. 1;

Fig. 5 is a fragmentary detail, partly in cut-away cross-section, of a portion of the lamp of Fig. 1;

Fig. 6 is a fragmentary detail, partly in cut-away cross-section, showing an alternate filament for the lamp of Fig. 1;

Fig. 7 is a cross-section of another embodiment of a lamp according to the invention;

Fig. 8 is an end view taken at line 8—8 of Fig. 7;

Fig. 9 is a fragmentary detail of a portion of the lamp shown in Fig. 7 taken at line 9—9 thereof;

Figure 12:
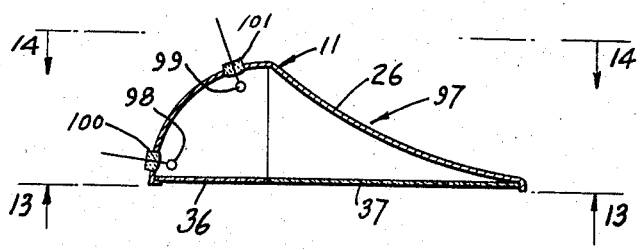
Figure 13:
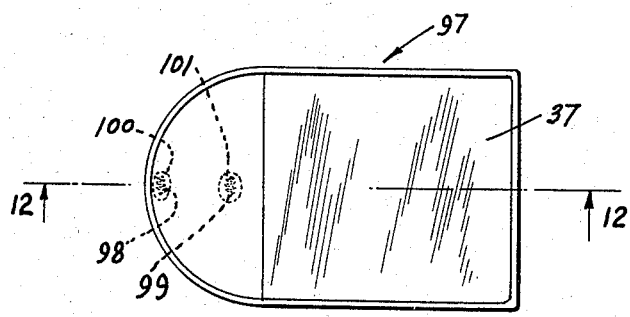
Figure 14:
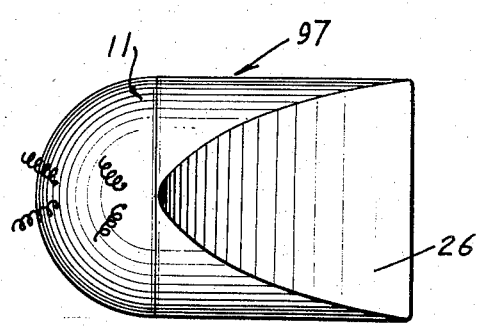

Fig. 12 is an elevation in cross-section of still another embodiment of the lamp taken at line 12—12 of Fig. 13; and Figs. 13 and 14 are bottom and top views taken respectively at lines 13—13 and 14—14 of Fig. 12.

For convenience in manufacture and replacement, this lamp may be initially produced in two separate parts, a first, upper part 11 and a second, lower part 12. The upper part will first be described.

A spherical sector 13 in the shape of one quarter of the surface of a sphere of radius R is given a reflected coating such as by layer 14 which may be of any convenient mirrorizing material such as silver or aluminum. A first incandescible filament 15 is provided adjacent the concave side of the sector 13, and is supported by a pair of struts 16 which also serve as conductors for electricity to make the filament incandesce. This filament may conveniently be mounted to the sector by the means shown in Fig. 5, wherein a vitreous plug 17 is pressed into an opening 18 in the sector 13. This plug has a convex reflecting surface 19 on the concave side of sector 13. The radius of curvature of surface 19 has the same value as that of the sector but its center of curvature is on the opposite side of the sector 13 therefrom. Surfaces 14 and 19 are therefore curved in the opposite sense.

Sector 13 and a sector 20 in the lower part together make up a spherical reflector or mirror. This mirror (and the lamp) has a central optical axis 22. Point 23 is the center of curvature of the mirror (and of both sectors).

A shell 24 is attached to the periphery of the sector 13. This shell has a cylindrical portion 25, and includes a curved reflecting surface 26. This curved surface is an axial segment of a cylinder, and has a radius Y which is preferably equal to about 2R. This curved surface 26 is generated by a straight-line generator such as generator 27 (see Fig. 2). This generator is always parallel to the forward edge 28 of the lamp. Dimension X will preferably be about one inch greater than 2R. Suitable lamp dimensions are: $R=3$ inches, $Y=6$ inches, and $X=7$ inches.

The lower part 12 of the lamp has a spherical sector 20 with a reflecting layer 30 thereon. A second incandescible filament 31 is contained in this lower part. This second incandescible filament has the same mounting means and location relative to the central optical axis as the first incandescible filament 15. In this lamp, it is preferable for the filaments to be disposed as close as possible to the spherical mirror and to axis 22. A spacing of about ⅛ inch from each appears to be an optimum spacing. The filaments are preferably disposed horizontally and are curved to follow surface 19. They may be placed vertically, if desired, but a horizontal position appears to give a better light distribution.

A window 32 is joined to the periphery of the spherical sector 20 and terminates in a straight edge 33. An enclosure surface 34 extends from edge 33 to the other edge of the sector 20, thereby making a complete enclosure of the second part so that it can be evacuated as desired.

The upper part 11 also has an enclosure surface 35 which is planar and extends from the edge 28 to the other edge of sector 13 so as to complete the enclosure of the upper part so that it, too, can be evacuated. All of the enclosure surface 34 is in contact with surface 35.

Planar mirror means 36 are disposed between the two filaments. In the preferred embodiment of the invention, these mirror means are semi-circular in shape and extend over the entire area of surfaces 34 and 35 which lie between edge 33 and the spherical mirror so as to reflect light incident thereon back into the respective parts of the lamp. A convenient means is to reflectively coat the appropriate area of surface 34 so that it reflects light from both sides. The outer end of transparent surface 35 adjacent to edge 28 is transparent and forms a window 37. The windows 32 and 37 are transparent. They may be made of clear glass, or may be tinted any desired color if a colored beam is desired from either or both parts of the lamp.

If desired, enclosure surface 34 could be omitted by fusing edge 33 to surface 35, thereby creating a one-piece lamp. Also, that part of surface 35 which forms window 37 could be omitted by providing a surface 37a (shown dotted in Fig. 1) for enclosing the upper part in the same manner as window 32 closes the lower part.

Another type of incandescible filament 38 suitable for use in the embodiment of Fig. 1 instead of the filaments illustrated therein, is shown in Fig. 6. A vitreous reflecting mount 39 is shown which has struts 40 and 41 similar to the struts 16 and plug 17 of Figs. 1 and 5. A ball-like filament 42 is supported by said struts and is incandesced by electricity supplied therethrough so that filament 42 provides substantially a point-source of light when it incandesces.

Still another embodiment of the invention is shown in Fig. 7. The lamp 45 shown therein may conveniently be made initially of two parts, an upper part 46 and a lower part 47 which parts are fused together at a joint 48 so as to make an evacuable enclosure. These parts may conveniently be mirror images of each other for economy in manufacture.

The lamp 45 has a spherical mirror 49 composed of two sectors. Sector 50 is integral with the upper part 46, and sector 51 is integral with the lower part 47. With further regard to the upper part of the lamp, the spherical sector 50 has a radius R and may conveniently be silvered or given any other desired reflective coating. An incandescible filament 52 similar to the filament 15 of Fig. 1 is attached to the lamp and faces the concave side of the spherical mirror. It will be disposed as closely as possible to the said concave side and be displaced only slightly from the central optical axis 53 of the lamp as in the lamp of Fig. 1.

A first shell 54 is attached to the periphery of the sector 50 and has a generally cylindrical portion 55. The first shell also includes a curved surface 56 which has a radius Z that preferably is equal to about 2R. This curved surface is similar in nature to the first curved surface 26 of the device of Fig. 1, in that it is generated by a straight-line generator such as generator 57 (Fig. 8), which generator is parallel to the forward edge 58 of the lamp. The lower part is the same in all structural details as the upper part 46.

A mirror 59 is placed at the joint between the parts, between the first incandescible filament 52 in the upper part and a second incandescible filament 60 in the lower part 47 of the lamp. The filaments in this lamp are shown vertical, instead of horizontal, as was done in Fig. 1. While a horizontal filament frequently gives a better lateral light distribution, occasionally a vertical filament is to be preferred when lateral distribution is not the prime consideration.

The spherical mirror 49 which includes sectors 50 and 51, all of the shell 54, and the cylindrical part 61 of the shell of the lower part, are all silvered for reflection. A curved surface 62 in the lower part similar to the curved surface 56 in the upper part, is not mirrored, but instead is left transparent for a window.

Fig. 9 illustrates the filament and planar mirror construction of lamp 45 in greater detail. In this embodiment, the performance of the device is not particularly improved by making the planar mirror any larger than that shown, because it is supplied solely to cut off the major portion of the rays of one filament from striking the sector occupied by the other filament.

Figure 10:
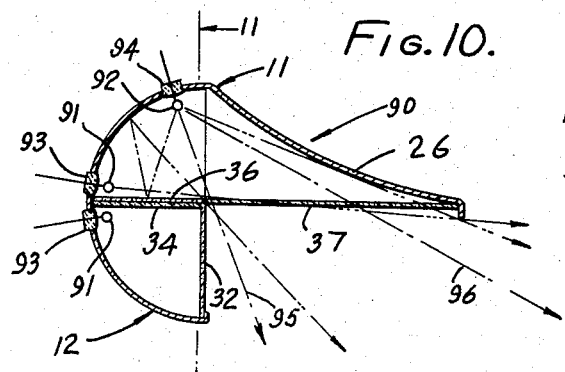
Fig. 10 is an elevation in cross-section of another embodiment of the lamp.
Figure 11:
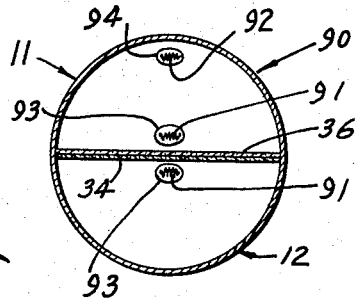
Fig. 11 is a cross-section taken at line 11—11 of Fig. 10.

The presently preferred embodiment of the lamp is shown in Fig. 10. This lamp 90 has the same over-all configuration as lamp 10 of Fig. 2 and like numbers denote like elements. There is an upper section 11, and a lower section 12 which sections preferably have rear reflectors which are spherical in nature. The principal difference between lamps 90 and 10 reside in the provision in lamp 90 of a plurality of filaments 91, 92 which are affixed to mounts 93, 94 respectively, which mounts are the same as mount 17. Filament 94 is disposed vertically above filament 91, and is intended to provide an increased illumination for a nearby area. For example, in going over the sharp brow of a hill, ordinary headlamps direct their beams well above the road ahead. As can be seen from exemplary rays 95 and 96, which proceed directly from filament 92, the lowermost beam from filament 92 illuminates the road very closely in front of the lamp so that in going over a hill, the road ahead is well lighted.

The lamp embodiment 97 shown in Fig. 12 has an upper section 11 which is the same as the upper section 11 of Fig. 1. This upper section provides, without the lower section, many of the unique advantages of this lamp. This lamp 97, like lamp 90, has two filaments 98, 99 which are respectively affixed to mounts 100 and 101, which are the same as mounts 17 of Fig. 1. The filament 98 provides rays similar to those provided by filament 15 of Fig. 1, while filament 99 provides rays similar to those of filament 92 of Fig. 10.

The optical features of these lamps will now be described. It will be understood that the device of Fig. 1 can, if desired, be made in the separate parts and that the separate parts need not be fused together. Then each part of the lamp can be installed or replaced separately. However, whether these parts are installed one at a time or both at the same time is not of importance to the invention. If desired, edge 33 could be fused to surface 35, and then surface 34 could be omitted. The lamp would then consist of but a single unit.

It will be seen that the upper part 11 of the device of Fig. 1 will provide a lower, relatively short range beam for an automobile. For example, rays 65, which are quite close to the central optical axis, are reflected downward by the upper curved surface 26. Rays 66 are further illustrative of those which are initially directed upward from the filament so as to strike the curved section 26 and are reflected downward by the curved section. It will be seen that rays between 65 and 66 will simply be spread out to make an even path of light ahead of the lamp.

With respect to rays from the filament which initially strike the spherical mirror, it will be seen these rays, such as rays 67, first strike the spherical mirror, then strike the curved surface 26, and are then reflected downward to the pavement.

Rays such as 68, which go downward to strike the planar mirror are reflected upward to strike the surface 26, and are thereafter reflected downward to the pavement.

The curved surface 19 on the filament mount (see Fig. 5) scatters the rays which are incident thereon such that they substantially follow paths similar to those which proceed directly from the filament to the various other reflecting surfaces, thereby making the light rays from the rear surface of the filament more effective in providing illumination.

With respect to the rays which may strike the cylindrical part 25, it will be seen, taking rays 69 (see Fig. 2) as exemplary that these rays will simply be reflected to the horizontally opposite side of the optical axis, but in every case their direction outward and upward is limited by the curved surface. It will thereby be appreciated that the upper part is incapable of emitting light rays which rise above the optical axis 22.

The lower part 12 is provided for the purpose of emitting a beam which extends farther ahead of the car than the beam from the upper part. Rays 70 which pass from the filament directly through the window 32 have their elevation limited by the edge 28, and do not appreciably rise above the optical axis. They are directed far ahead of the car. If desired, a small lip 71 can be provided which overhangs the optical axis by this distance by which the filament extends below the said optical axis. This eliminates any possibility of rays passing above the axis to glare into the eyes of oncoming motorists. Of course it is necessary to initially adjust the direction of the said axis in order to keep the rays below a predetermined level.

Rays 72 are exemplary of those which pass from the filament to strike the spherical mirror and are reflected by the spherical mirror downward to strike the pavement. Rays 73 are exemplary of a limiting case, wherein the rays strike near the perimeter of the sector and are reflected upward thereby. These rays 72 are reflected by the curved surface 26 down to the pavement so that they cannot pass out of the lamp above the optical axis.

Rays 74 are exemplary of rays which pass upward to strike the planar mirror and are thereby reflected down to the pavement. This lower part thereby provides a "high" beam having a swath from the optical axis down to the ground at a point considerably ahead of the car.

The semi-circular planar mirror serves to enable the rays from a spherical reflector to be confined to a narrowly defined bundle. Without this planar mirror, there would be considerable scattering of rays. In addition, rays from the upper filament are prevented from impinging on the lower sector, and this is important, because such rays might otherwise be reflected upward to produce a glare.

It will therefore be seen that this lamp provides a brightly illuminated path with upper and lower beams which utilizes and provides all of its light to the aforesaid path without scattering any rays into the eyes of oncoming motorists. The distribution of the light from this lamp is favorable, as can be seen from the various exemplary rays.

The output from the lamp shown in Fig. 7 is similar, to that of Fig. 1, except that planar mirror 59 is of lesser extent than mirror 36. Planar mirror 59 serves to block out the major portion of rays such as ray 80 which might otherwise proceed downward to strike the spherical mirror in the other part of the lamp and then be reflected outward above the optical axis. Otherwise, the distribution of light from the lamp is the same as for that in Fig. 1.

The lamp embodiments of Figs. 10 through 14 provide illumination from their filaments which are the same as the illumination from the corresponding filaments of Fig. 1. However, the additional filaments 92 and 99 provide a lower beam for illuminating the surface of the road immediately ahead of the automobile so that the road is lighted up even when the automobile is proceeding over a very sharp brow of a hill.

The principal reflector in this lamp is shown as spherical, and this shape is the preferred embodiment. The planar mirror enables such a shape to be utilized, and in the combination of elements shown in the drawings, this spherical mirror gives unexpectedly good results. However, other more conventional shapes can also be used such as parabolic mirrors. These do not give quite the brilliant, closely controlled beam which results from the use of a spherical mirror, but still there is a great improvement over conventional headlamps, spotlights, and other beam-type lamps. Therefore the term "concave" reflector or "concave mirror" contemplates any shape suitable for reflecting light from a filament in combination with a planar mirror disposed substantially on the axis thereof.

In the embodiments shown, a hemispherical mirror has been used. This is an inexpensive surface to manufacture, and, with the remainder of the structure illustrated, gives an optimum light distribution. This lamp thereby avoids many of the complexities and complications of parabolic reflectors. It will also be understood that spherical mirrors of less than hemispherical area can be utilized. Then the depth of the mirror would be less than its radius of curvature. The term "spherical mirror" therefore comprehends a reflecting surface having the configuration of a portion of a sphere.

Also, it will be noted that the filaments are disposed closer to the reflecting surface than to the center of curvature. In fact, in the preferred embodiment as shown in Fig. 1, the filaments are significantly closer to the surface than to the said center, and are quite close to the optical axis. However, many of the benefits of this invention can still be obtained by placing the filaments farther from the central axis and closer to the radius of curvature.

Without the planar mirror means as shown, it would not be possible to use any type of reflector, and particularly a spherical reflector, and still obtain the advantages of this invention. This invention therefore comprehends the use of a combination of a planar and a concave mirror, whereby the desirable light distribution as shown can be secured.

It will be recognized that there are other uses for this lamp besides as a headlight; for example, in spotlights and the like where a carefully controlled light beam is desired. However, this device should find its principal usefulness in automotive headlights, where a glare-free lamp is very desirable.

This invention is not to be limited by the embodiments shown in the drawings and described in the description, which are given by way of example and not of limitation, but only in accordance with the scope of the appended claims.

I claim:

1. In a lamp having an optical axis, the combination comprising: a concave reflector having a concave side; a shell attached to the periphery of the said reflector and extending axially forwardly away from said reflector on the concave side thereof toward a forward edge of the lamp, said shell including a curved reflecting surface which is generated by a straight-line generator maintained parallel to said edge, said curved reflecting surface being convex toward the concave side of the reflector; enclosure means joining said edge, said reflector, and said shell, whereby an evacuable enclosed space is provided adjacent the concave side of the reflector; a pair of incandescible filaments mounted between the reflector and the edge within the enclosed space; and a planar mirrored surface parallel to said axis and to said edge, a portion of the area of the planar mirrored surface being disposed at a distance from the concave reflector; the reflector, shell, and curved surface being reflectively coated, and a portion of the enclosure means spaced from the concave reflector being transparent, the incandescible filaments being mounted at different elevations from the planar mirrored surface, the filament farther from the planar mirrored surface being axially closer to the edge than the filament closer to the planar mirrored surface.

2. A lamp according to claim 1 in which the planar mirrored surface is integral with the enclosure means and extends between the transparent portion of the enclosure means and the concave reflector.

3. A lamp according to claim 1 in which a second concave reflector is disposed on the other side of the enclosure means from the first-mentioned concave reflector, and in which second enclosure means join to said first-mentioned enclosure means and the second concave reflector to provide a second evacuable enclosed space adjacent to the second concave reflector, and a third incandescible filament disposed in said second evacuable enclosed space.

References Cited in the file of this patent

UNITED STATES PATENTS

| | | |
|---|---|---|
| 1,804,049 | Claus | May 5, 1931 |
| 2,189,164 | Carlisle | Feb. 6, 1940 |
| 2,766,394 | Darsie | Oct. 9, 1956 |